(12) United States Patent
Nabors et al.

(10) Patent No.: US 10,396,319 B2
(45) Date of Patent: Aug. 27, 2019

(54) BATTERY PACK FOR COORDINATE MEASUREMENT MACHINE

(71) Applicants: Jason Elliot Nabors, Grand Prairie, TX (US); Jesse Lewis Nabors, Owasso, OK (US)

(72) Inventors: Jason Elliot Nabors, Grand Prairie, TX (US); Jesse Lewis Nabors, Owasso, OK (US)

(*) Notice: Subject to any disclaimer, the term of this patent is extended or adjusted under 35 U.S.C. 154(b) by 373 days.

(21) Appl. No.: 15/179,488

(22) Filed: Jun. 10, 2016

(65) Prior Publication Data
US 2016/0365549 A1    Dec. 15, 2016

Related U.S. Application Data

(60) Provisional application No. 62/173,540, filed on Jun. 10, 2015.

(51) Int. Cl.
| | |
|---|---|
| *H01M 2/10* | (2006.01) |
| *H02J 7/00* | (2006.01) |
| *H01M 10/0525* | (2010.01) |
| *H01M 10/48* | (2006.01) |
| *H01M 10/44* | (2006.01) |

(52) U.S. Cl.
CPC ....... *H01M 2/1022* (2013.01); *H01M 2/1055* (2013.01); *H01M 10/488* (2013.01); *H02J 7/0021* (2013.01); *H02J 7/0044* (2013.01); *H01M 10/0525* (2013.01)

(58) Field of Classification Search
CPC .. H01M 2/1022; H01M 10/44; H01M 10/488; H01M 10/0525; H01M 2220/30
See application file for complete search history.

(56) References Cited

U.S. PATENT DOCUMENTS

| | | | |
|---|---|---|---|
| 7,568,293 B2 | 8/2009 | Ferrari | |
| 2004/0103547 A1* | 6/2004 | Raab | B23Q 35/04 33/503 |
| 2016/0084633 A1 | 3/2016 | Ferrari et al. | |
| 2016/0102965 A1 | 4/2016 | York et al. | |

FOREIGN PATENT DOCUMENTS

JP    2000-268791    * 9/2000    ............. H01M 2/10

* cited by examiner

*Primary Examiner* — Osei K Amponsah
(74) *Attorney, Agent, or Firm* — Dunlap Bennett & Ludwig PLLC; Brendan E. Squire

(57) ABSTRACT

A Battery Pack for portable CMM technology. The battery gives the CMM a longer operating period and extends battery time. The battery pack is configured to work with different operating voltages required by measurement equipment made by various manufactures'. The battery pack also provides a common mounting platform adapted to be utilized with the standard 3½-8 threaded equipment and accessories.

10 Claims, 4 Drawing Sheets

BATTERY PACK FOR COORDINATE MEASUREMENT MACHINE

CROSS-REFERENCE TO RELATED APPLICATION

This application claims the benefit of priority of U.S. provisional application No. 62/173,540, filed Jun. 10, 2015 the contents of which are herein incorporated by reference.

BACKGROUND OF THE INVENTION

The present invention relates electronic power sources, and more particularly to an electronic power source for coordinate measurement machines (CMM).

Currently, the time in which a portable CMM can be operated on battery power is limited. In addition, the CMM may need to be operated at different voltages for the various CMM items that that may be utilized by a technician that are manufactured by different companies. Other solutions in the industry do not provide the operator the ability to use their equipment for a longer period of time without the need to be charged with AC power. Similarly, the various battery packs available do not provide a professional mounting system. Consequently, the setup of the CMM equipment with these battery packs prolongs set up time and presents a cluttered arrangement that is not conducive to precision measurements in field environments.

As can be seen, there is a need for a battery pack that gives the operator a longer period of working time, with the ability to work with different manufactures' products while using one common mounting platform.

SUMMARY OF THE INVENTION

In one aspect of the present invention, a battery pack for a coordinate measurement machine (CMM), is provided. The battery pack having a substantially hollow case having at least one sidewall, a top end, and a bottom end; a battery module contained within the case; a bottom end cap having a base coupler at a central portion thereof adapted to cooperatively engage with a base; and a top end cap having a top coupler at a central portion thereof, the coupling adapted to cooperatively engaged with a corresponding fitting of CMM positioning accessory. In some embodiments, the base coupler comprises a female threaded portion and in other embodiments, the top coupler comprises a male threaded portion. The bottom end cap is integrally formed with the case. The battery module may include a plurality of battery cells. The plurality of battery cells may be connected in series parallel. The battery pack may have an electrical housing attached to an outer surface of the at least one sidewall, and one or more of a power switch, an input power connector, an output power connector, and a visual indicator contained within the electrical housing. The visual indicator may be a plurality of LED lights configured to provide a visual display of a charge state of the battery module. An isolator may be interposed between an interior surface of the top cap and an end of the battery module. The isolator may also be interposed between an interior surface of the bottom end cap and the battery module.

Other aspects of the invention include a method of providing battery power to a coordinate measurement machine (CMM). The method includes providing a battery pack having a case adapted to interconnect a base with a CMM positioning accessory. The method may also include connecting the battery pack to the base and the CMM positioning accessory. Additionally, the method includes connecting a CMM measurement tool to the CMM positioning accessory. Preferably, the method also includes electrically connecting a power output connector of the battery pack with an input power connector of the CMM measurement tool. As an additional step, the method includes performing a precision measurement of an article with the CMM measurement tool. When the battery pack has been at least partially discharged, the method may include recharging the battery pack.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a battery pack that may be assembled to a piece of coordinate measuring machine (CMM) apparatus.

Figure 1:
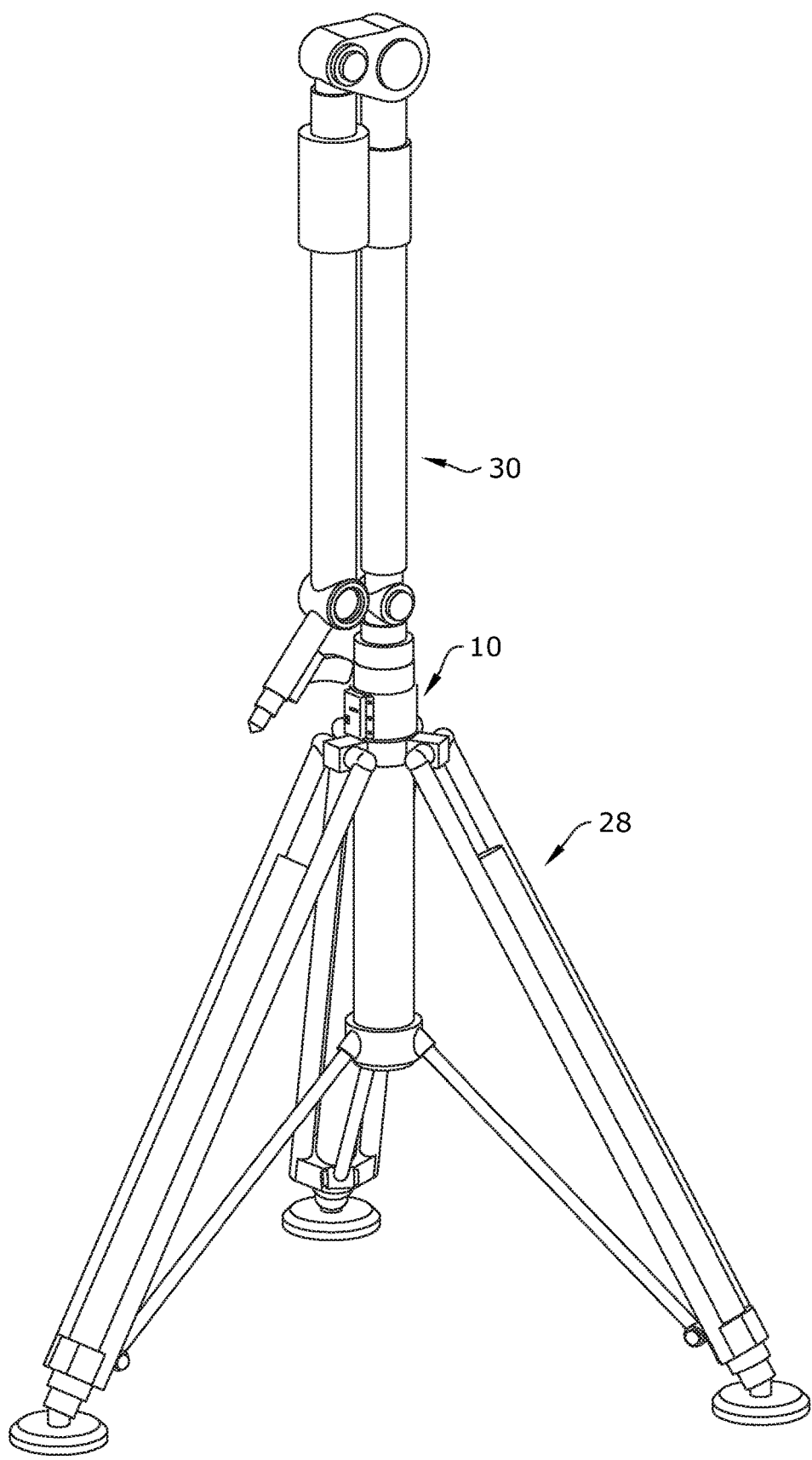
FIG. 1 is a perspective view of an embodiment of a CMM Battery Pack shown in use.

FIG. 1 illustrates a representative item of CMM equipment is illustrated and equipped with a CMM battery pack 10. The CMM equipment will typically include a base 28, such as a tripod, to support a precision CMM tool 30 that may be manipulated into position to perform a desired measurement of an article. The CMM battery pack 10 of the present invention has a bottom end that may be joined to the equipment interposed between the base 28 and the articulating arm 30. This configuration facilitates the setup, use, and reliability of the CMM system while operating on battery power, such as in field or remote locations where a technician may be tasked to perform precision measurements of an article.

Figure 2:
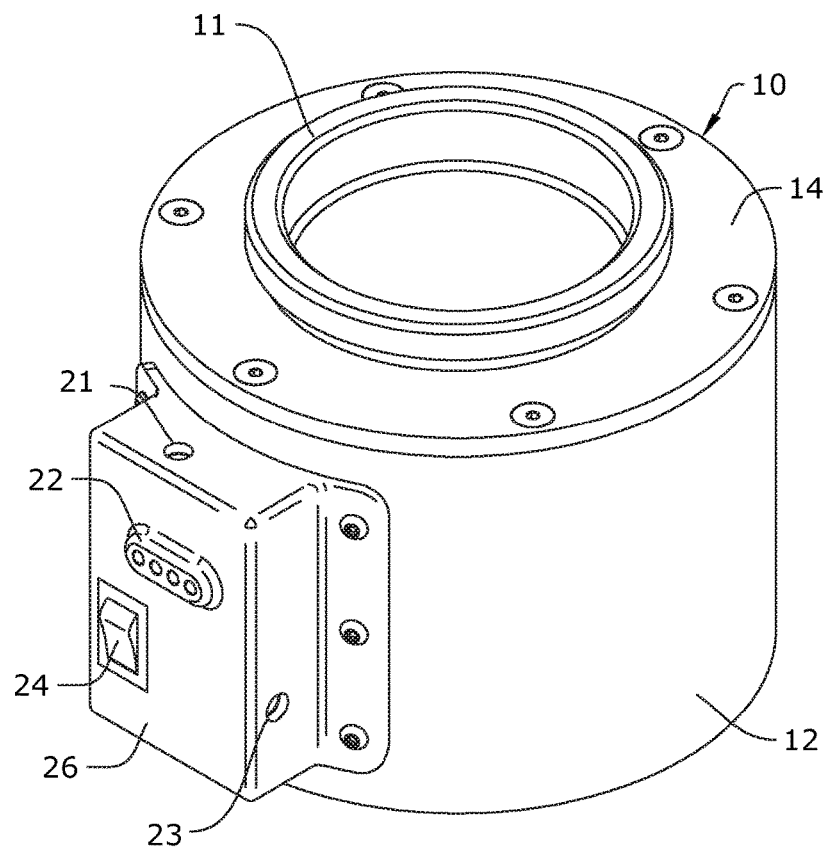
FIG. 2 is a top perspective view of the battery pack.
Figure 3:
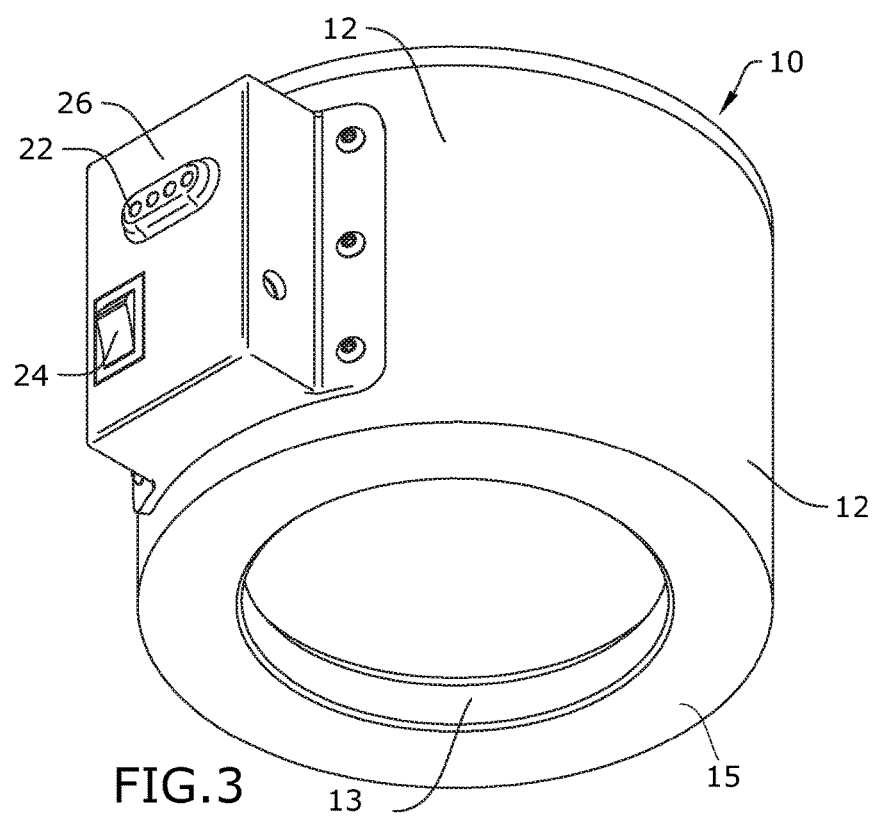
FIG. 3 is a bottom perspective view of the battery pack.

An embodiment of a CMM battery pack 10 is seen in reference to FIGS. 2 and 3. The CMM battery pack 10 includes a substantially hollow case 12 having at least one sidewall, a top end, and a bottom end. The case 12 may be formed of a rigid material, such as metal, and is preferably formed from a lightweight aluminum. A top end cap 14 may be attached to the top end of the case 12 via a plurality of fasteners, such as bolts, screws, or rivets. The end cap 14 may also be attached to the case via thread defined in the lateral edges of the cap 14 and an end portion of the case 12.

The top end cap 14 may also be formed of a metal. In a preferred embodiment, the threaded portion is preferably formed of a stainless steel.

The top end cap 14 has a coupling 11 extending from a central portion of the cap 14 that is adapted to engage with a corresponding coupling of the articulating arm 30, or similar component of a CMM apparatus. Preferably the coupling 11 will be defined with a male threaded portion to engage with a corresponding female threaded portion of the coupling of the articulating arm 30. The male threaded portion is preferably configured with 3½-8 threads.

The bottom end of the case 12 has a bottom end cap 15 that may be coupled to the case 12 in a manner similar to that of the top end cap 14. Alternatively the bottom end cap 15 may be integrally formed with the case. The bottom end cap 15 will have a base coupler 13 defined in a central portion of the bottom end cap 15 for cooperative engagement with the base 28. Preferably the base coupler 13 will have a female threaded portion that is adapted to engage with a male threaded portion of the base 28.

An electrical housing 26 may be attached to an exterior surface of the at least one sidewall. The electrical housing 26 may provide a mounting enclosure for an electrical input connector 21, at least one indicator light 22, an electrical output connector 23, and a control switch 24. The electrical input connector 21 provides an electrical connection between an electrical input from a charging power source (not shown) in order to recharge the battery pack 10. The electrical output connector 23 may be operatively connected to a power input of the selected CMM equipment and conducts electrical power from the battery pack 10 to the selected equipment.

The at least one indicator light 22 may provide any one of an indication of an operating condition of the battery pack 10. For example the indicator light 22 may indicate that the unit 10 is in an on condition providing power to the CMM equipment. It may also provide a visual indication that the unit 10 is being changed by the charging power source. The indicator light 22 may also be configured to provide a visual indication of the charge level of a battery, for example a percentage of charge. The indicator light 22 may include a plurality of light emitting diode (LED) lights. The control switch 24 is operable between at least an on and an off position to control a voltage output of the battery pack 10 to the selected CMM equipment to be powered by the battery pack 10.

Figure 4:
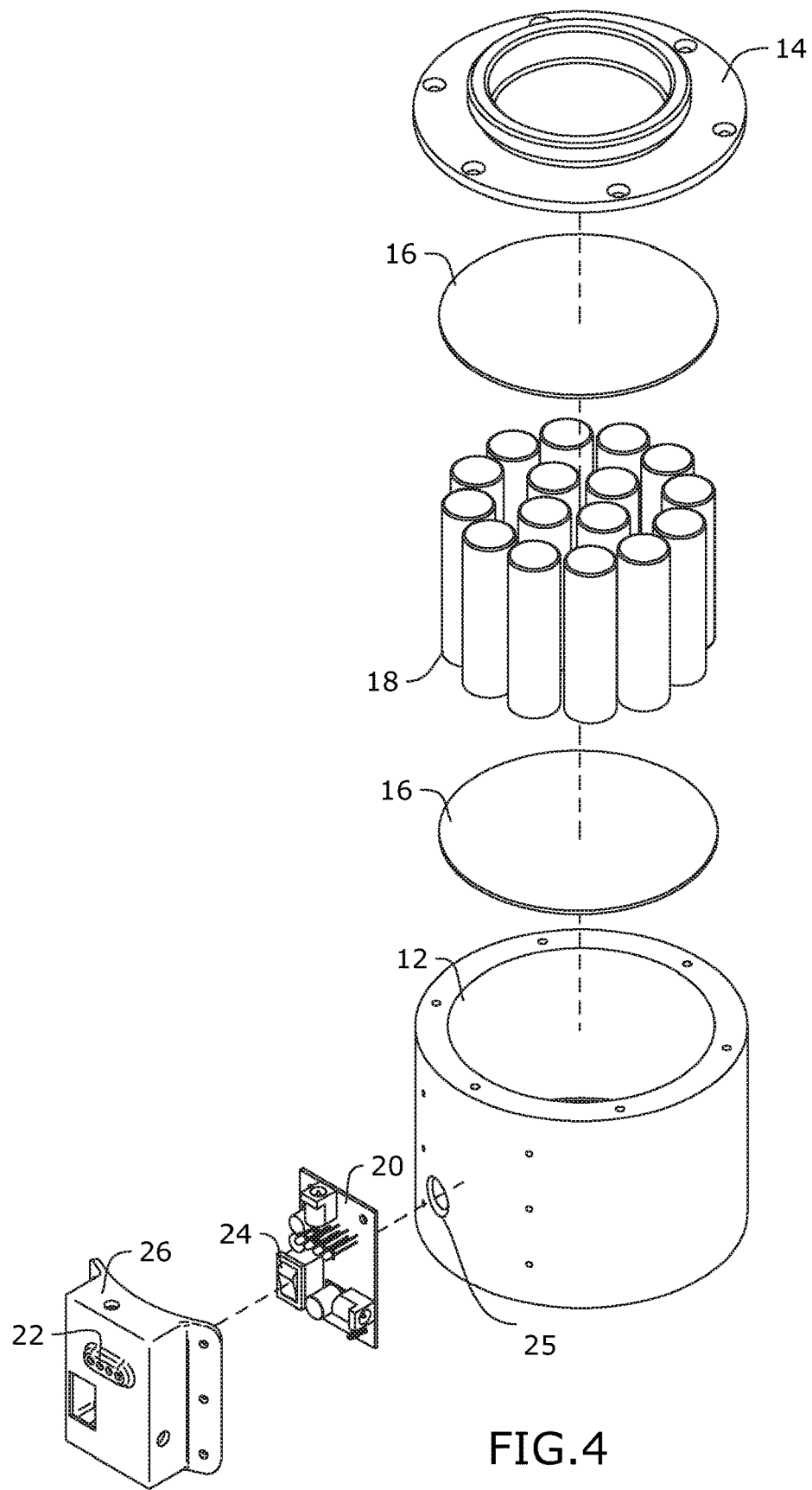
FIG. 4 is an exploded view of the battery pack.

As seen in reference to FIG. 4, the battery pack 10 of the present invention will also include a battery module 18. Preferably the battery module 18 is formed from one or a plurality of battery cells. More preferably, the battery module 18 is a lithium ion battery. The battery module 18 is contained within the sidewall of the case 12. An isolation layer 16 is provided between the ends of the battery module 18 and the respective top and bottom caps 14, 15 to provide electrical isolation of the cells and to prevent the infiltration of contaminants such as dirt and debris. Preferably the isolation layer 16 is formed of an electrically insulated material.

In further reference to FIG. 4, an aperture 25 is formed through the sidewall of the case 12 in order to permit passage of one or more electrical conductors from within the case 12 to an exterior of the case 12. The electrical housing 26 is preferably mounted to cover the aperture 25. The electrical housing 26 may carry one or more circuit boards configured to provide one or more electrical control or distribution functions for the battery pack 10. One or more circuit boards may also be configured within the case 12.

Figure 5:
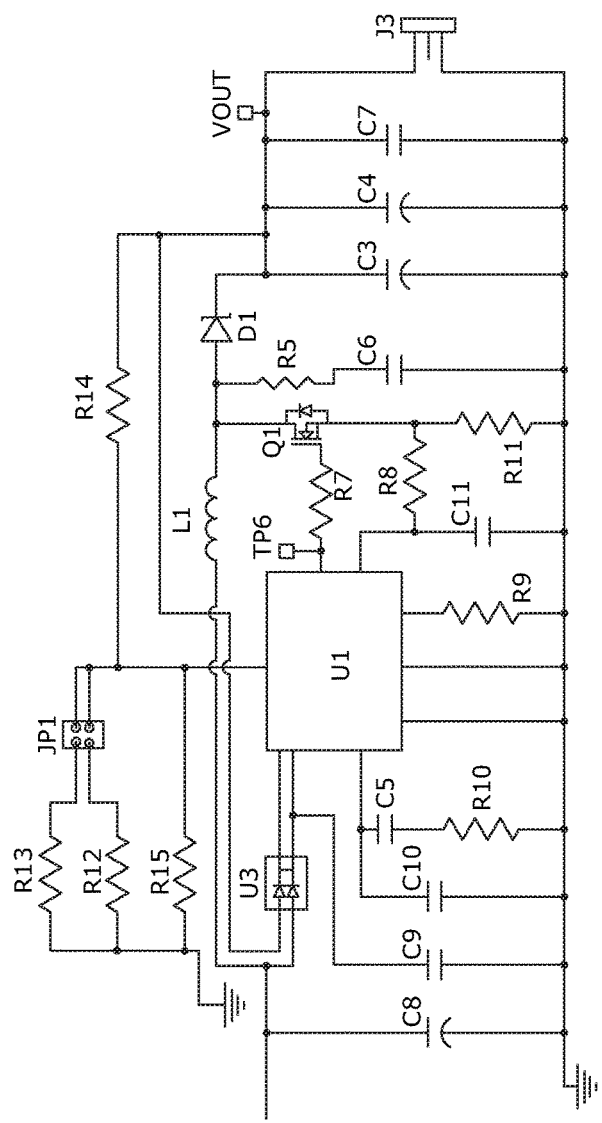
FIG. 5 is an embodiment of a variable voltage output circuit.

An embodiment of a variable voltage output circuit is illustrated in reference to FIG. 5. The circuit may be configured to provide variable voltage output from the battery pack 10 to configure the battery pack 10 for operation with CMM equipment having different power requirements. The circuit may be configured for producing discrete voltages corresponding to a standard input voltage for typical CMM equipment, such as 12 volts, 18 volts, or 19.3 volts. The output voltage may be user selectable by positioning a conductor across JP1. The output voltage from the circuit may be connected with the electrical output connector 23.

Figure 6:
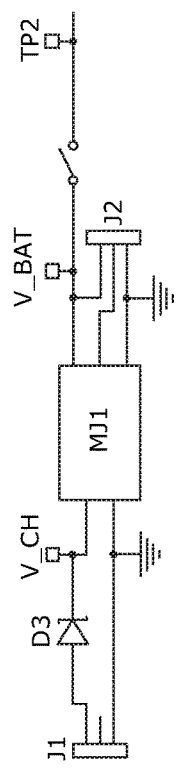
FIG. 6 is an embodiment of a battery charging circuit.

As seen in reference to FIG. 6, a charging circuit is operatively connected to the input power source and the input voltage connection 21 via the connection at J1. The circuit MJ1 may provide for component protection from an over charge condition and regulating the discharge of the Li ion battery 18.

Figure 7:
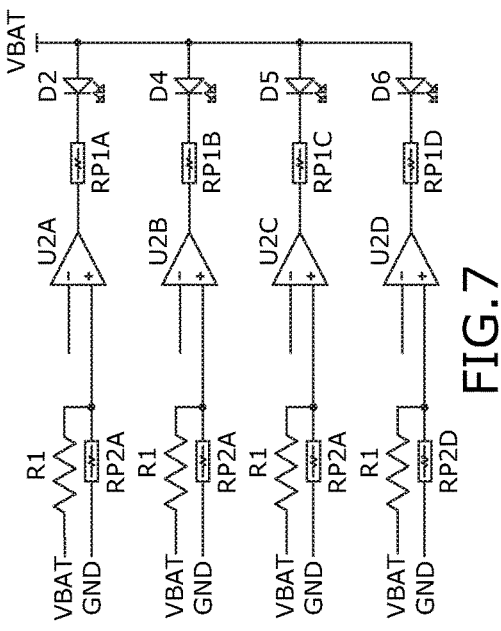
FIG. 7 is an embodiment of a driver circuit for LED indicator lights.

A driving circuit for the one or more indicator lights 22 is illustrated in FIG. 7. In the embodiment shown a plurality of LED lights provide a visual representation of battery power condition. For example a green indication may correspond to a charge of approximately 100% to 75%. A charge condition of between about 75%-50% may be indicated illumination of an amber LED light 22. A weak or battery charge of below about 25% may be indicated by a red LED light 22.

Figure 8:
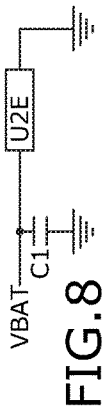
FIG. 8 is an embodiment of a dc power output circuit.

FIG. 8 dc output-standard output of 12 volts can be changed to 18 or 19.3 depending on application.

Figure 9:
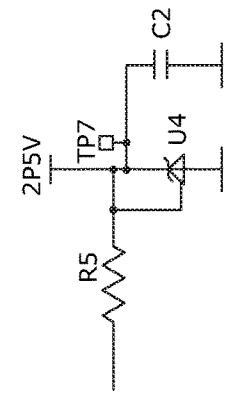
FIG. 9 is an embodiment of a charging input circuit.

A charging input is shown in reference to FIG. 9 to receive a dc voltage input-charging input for recharging the batteries 18.

It should be understood, of course, that the foregoing relates to exemplary embodiments of the invention and that modifications may be made without departing from the spirit and scope of the invention as set forth in the following claims.

What is claimed is:

1. A battery pack for a coordinate measurement machine (CMM), comprising:
    a substantially hollow case having at least one sidewall, a top end, and a bottom end;
    a battery module contained within the case;
    a bottom end cap having a base coupler at a central portion thereof, the base coupler adapted to cooperatively engage with a base supporting the CMM; and
    a top end cap having a coupling extending from a central portion of the top end cap, the coupling adapted to cooperatively engage with a corresponding fitting of a CMM positioning accessory, wherein the battery pack is configured to be interposed between the base and the CCM positioning accessory.

2. The battery pack of claim 1, wherein the base coupler comprises a female threaded portion.

3. The battery pack of claim 1, wherein the coupling comprises a male threaded portion.

4. The battery pack of claim 2, wherein the bottom end cap is integrally formed with the case.

5. The battery pack of claim 2, wherein the battery module comprises a plurality of battery cells.

6. The battery pack of claim 5, wherein the plurality of battery cells are connected in series parallel.

7. The battery pack of claim 1, further comprising:
    an electrical housing attached to an outer surface of the at least one sidewall, and
    one or more of a power switch, an input power connector, an output power connector, and a visual indicator.

8. The battery pack of claim 7, wherein the visual indicator comprises a plurality of LED lights configured to provide a visual display of a charge state of the battery module.

9. The battery pack of claim 5, further comprising an isolator interposed between an interior surface of the top end cap and an end of the battery module.

10. The battery pack of claim 9, wherein the isolator is interposed between an interior surface of the bottom end cap and the battery module.

* * * * *